US012385552B2

(12) United States Patent
Rohlfing et al.

(10) Patent No.: US 12,385,552 B2
(45) Date of Patent: Aug. 12, 2025

(54) TRANSMISSION DEVICE AND AGRICULTURAL MACHINE HAVING A TRANSMISSION DEVICE

(71) Applicant: DEERE & COMPANY, Moline, IL (US)

(72) Inventors: Thomas J. Rohlfing, Eldridge, IA (US); Prashant M. Jundale, Pune (IN); Javier J. Perez Ramirez, Pinto (ES)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/732,757

(22) Filed: Jun. 4, 2024

(65) Prior Publication Data

US 2024/0401675 A1   Dec. 5, 2024

(30) Foreign Application Priority Data

Jun. 5, 2023  (EP) .................................... 23177333

(51) Int. Cl.
*F16H 9/04* (2006.01)
*A01D 69/06* (2006.01)
(Continued)

(52) U.S. Cl.
CPC ............... *F16H 9/04* (2013.01); *A01D 69/06* (2013.01); *A01D 69/08* (2013.01); *F16D 11/10* (2013.01);
(Continued)

(58) Field of Classification Search
CPC .... F16H 9/04; F16H 25/18; F16H 2200/0034; F16H 2063/3093; F16D 11/14;
(Continued)

(56) References Cited

U.S. PATENT DOCUMENTS 546,703 A * 9/1895 Lippy ..................... B23Q 5/00
74/370
3,436,977 A * 4/1969 Gredell ............. F16H 61/66245
474/70
(Continued)

FOREIGN PATENT DOCUMENTS

CN      207437710 U    6/2018
DE        1031601 B    6/1958
(Continued)

OTHER PUBLICATIONS

Extended European Search Report and Written Opinion issued in European Patent Application No. 23177333.4 dated Oct. 27, 2023, in 16 pages.
(Continued)

*Primary Examiner* — Henry Y Liu (57) ABSTRACT

A transmission device and an agricultural harvesting machine include a first drive input element, a second drive input element, a shift sleeve configured as a hollow shaft, and a drive output shaft. The shift sleeve is mounted axially displaceably on the drive output shaft and is configured to be moved by axial displacement into one of a first position, a second position, and a third shift position. An internal toothing is formed on each of the first drive input element and the second drive input element. An external toothing and an internal toothing are formed on the shift sleeve. An external toothing is formed on the drive output shaft.

10 Claims, 5 Drawing Sheets

(51) Int. Cl.
*A01D 69/08* (2006.01)
*A01F 29/14* (2006.01)
*F16D 11/10* (2006.01)

(52) U.S. Cl.
CPC ...... *A01F 29/14* (2013.01); *F16H 2200/0034* (2013.01)

(58) Field of Classification Search
CPC ... F16D 11/10; F16D 2011/004; A01D 69/08; A01D 69/06; A01F 29/14; A01F 12/14
USPC .......................................................... 474/76
See application file for complete search history.

(56) References Cited

U.S. PATENT DOCUMENTS

| | | | | |
|---|---|---|---|---|
| 3,581,853 | A * | 6/1971 | Hoff | B62M 7/00 |
| | | | | 192/48.92 |
| 4,598,599 | A * | 7/1986 | Ikemoto | F16H 3/385 |
| | | | | 74/339 |
| 4,662,861 | A * | 5/1987 | Seung | F02B 67/06 |
| | | | | 192/48.92 |
| 4,943,268 | A * | 7/1990 | Eisenmann | F16H 3/722 |
| | | | | 475/95 |
| 6,773,367 | B2 * | 8/2004 | Laufenberg | A01D 69/08 |
| | | | | 56/11.1 |
| 6,929,574 | B2 * | 8/2005 | Laufenberg | F16H 9/04 |
| | | | | 474/73 |
| 7,059,982 | B2 * | 6/2006 | Jonckheere | F16H 61/66268 |
| | | | | 474/18 |
| 8,313,400 | B2 * | 11/2012 | Serkh | F16H 55/36 |
| | | | | 474/69 |
| 9,169,904 | B2 * | 10/2015 | Graves | B60K 25/02 |
| 9,556,938 | B2 * | 1/2017 | Murray | F16D 11/14 |
| 10,295,026 | B2 * | 5/2019 | Williams | A01D 69/06 |
| 2004/0009834 | A1 * | 1/2004 | Laufenberg | A01D 69/06 |
| | | | | 474/73 |
| 2004/0043847 | A1 * | 3/2004 | Jonckheere | A01D 41/1274 |
| | | | | 474/33 |
| 2004/0204273 | A1 * | 10/2004 | Laufenberg | A01D 69/06 |
| | | | | 474/70 |
| 2006/0154763 | A1 * | 7/2006 | Serkh | F16H 9/04 |
| | | | | 474/70 |
| 2010/0120563 | A1 * | 5/2010 | Serkh | F16H 55/36 |
| | | | | 474/74 |
| 2013/0210506 | A1 * | 8/2013 | Hollatz | A01F 12/40 |
| | | | | 460/112 |
| 2014/0031156 | A1 * | 1/2014 | Graves | B60K 25/02 |
| | | | | 474/71 |
| 2014/0148286 | A1 * | 5/2014 | Murray | A01D 69/08 |
| | | | | 474/76 |
| 2018/0195585 | A1 * | 7/2018 | Williams | F16H 9/04 |

FOREIGN PATENT DOCUMENTS

| | | |
|---|---|---|
| DE | 2744344 C3 | 11/1981 |
| DE | 2745564 C2 | 5/1982 |
| DE | 102019213717 A1 | 3/2021 |
| EP | 0195706 A1 | 9/1986 |
| GB | 1344115 A | 1/1974 |

OTHER PUBLICATIONS

Wikipedia article referring to DIN 780—Standard specification for gear modules according to German Engineering Standard No. 780, pp. 1-7, [online], [retrieved on Jan. 7, 2020]. Retrieved from the Internet <URL: https://de.wikipedia.org/w/index.php?title=Modul(Gear)&oldid=238602105>.

* cited by examiner

TRANSMISSION DEVICE AND AGRICULTURAL MACHINE HAVING A TRANSMISSION DEVICE

CROSS-REFERENCE TO RELATED APPLICATIONS

This application claims priority to European Patent Application No. 23177333.4, filed Jun. 5, 2023, which is hereby incorporated by reference in its entirety.

BACKGROUND

Transmission devices and drive apparatuses having transmissions for drivable processing devices on harvesting machines are known and are used in various forms in a variety of ways. In order to avoid expensive and complex transmission devices, belt drives may be provided with transmission devices having multiple pulleys at the drive input side.

SUMMARY

In accordance with aspects of the present disclosure, a transmission device is provided. The transmission device includes a first drive input element, a second drive input element, a shift sleeve configured as a hollow shaft, and a drive output shaft; wherein the shift sleeve is mounted axially displaceably on the drive output shaft and is configured to be moved by axial displacement into one of a first position, a second position, and a third shift position; wherein an internal toothing is formed on each of the first drive input element and the second drive input element; wherein an external toothing and an internal toothing are formed on the shift sleeve; wherein an external toothing is formed on the drive output shaft; wherein, in the first shift position, the external toothing of the shift sleeve forms a first toothing pairing with the internal toothing of the first drive input element; wherein, in the second shift position, the external toothing of the shift sleeve forms a second toothing pairing with the internal toothing of the second drive input element; wherein the internal toothing of the shift sleeve forms a third toothing pairing with the external toothing of the drive output shaft; and wherein the first toothing pairing, the second toothing pairing, and the third toothing pairing are configured with a tooth pitch which is greater by a factor of two than a tooth pitch associated with standardized toothed gear moduli such that a tooth spacing that is greater by a factor of two is achieved.

A plurality of annular grooves may be formed on the inside of the shift sleeve, and one of the plurality of annular grooves may be assigned to each of the first shift position, the second shift position, and the third shift position, wherein each of the plurality of annular grooves may be placed in engagement, by axial displacement of the shift sleeve on the drive output shaft, with at least one detent bolt that is mounted in spring-preloaded fashion in the drive output shaft. On one axial end of the shift sleeve, there may be formed an actuating boss for the axial adjustment and rotational alignment of the shift sleeve. The drive output shaft may be configured as a hollow shaft and may have an internal toothing. The transmission device may be configured as a belt drive transmission, and the first drive input element and the second drive input element may each comprise a pulley.

In accordance with aspects of the present disclosure, an agricultural harvesting machine having a belt drive and a transmission device assigned to the belt drive is provided. The transmission device includes a first drive input element, a second drive input element, a shift sleeve configured as a hollow shaft, and a drive output shaft; wherein the shift sleeve is mounted axially displaceably on the drive output shaft and is configured to be moved by axial displacement into one of a first position, a second position, and a third shift position; wherein an internal toothing is formed on each of the first drive input element and the second drive input element; wherein an external toothing and an internal toothing are formed on the shift sleeve; wherein an external toothing is formed on the drive output shaft; wherein, in the first shift position, the external toothing of the shift sleeve forms a first toothing pairing with the internal toothing of the first drive input element; wherein, in the second shift position, the external toothing of the shift sleeve forms a second toothing pairing with the internal toothing of the second drive input element; wherein the internal toothing of the shift sleeve forms a third toothing pairing with the external toothing of the drive output shaft; and wherein the first toothing pairing, the second toothing pairing, and the third toothing pairing are configured with a tooth pitch which is greater by a factor of two than a tooth pitch associated with standardized toothed gear moduli such that a tooth spacing that is greater by a factor of two is achieved.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
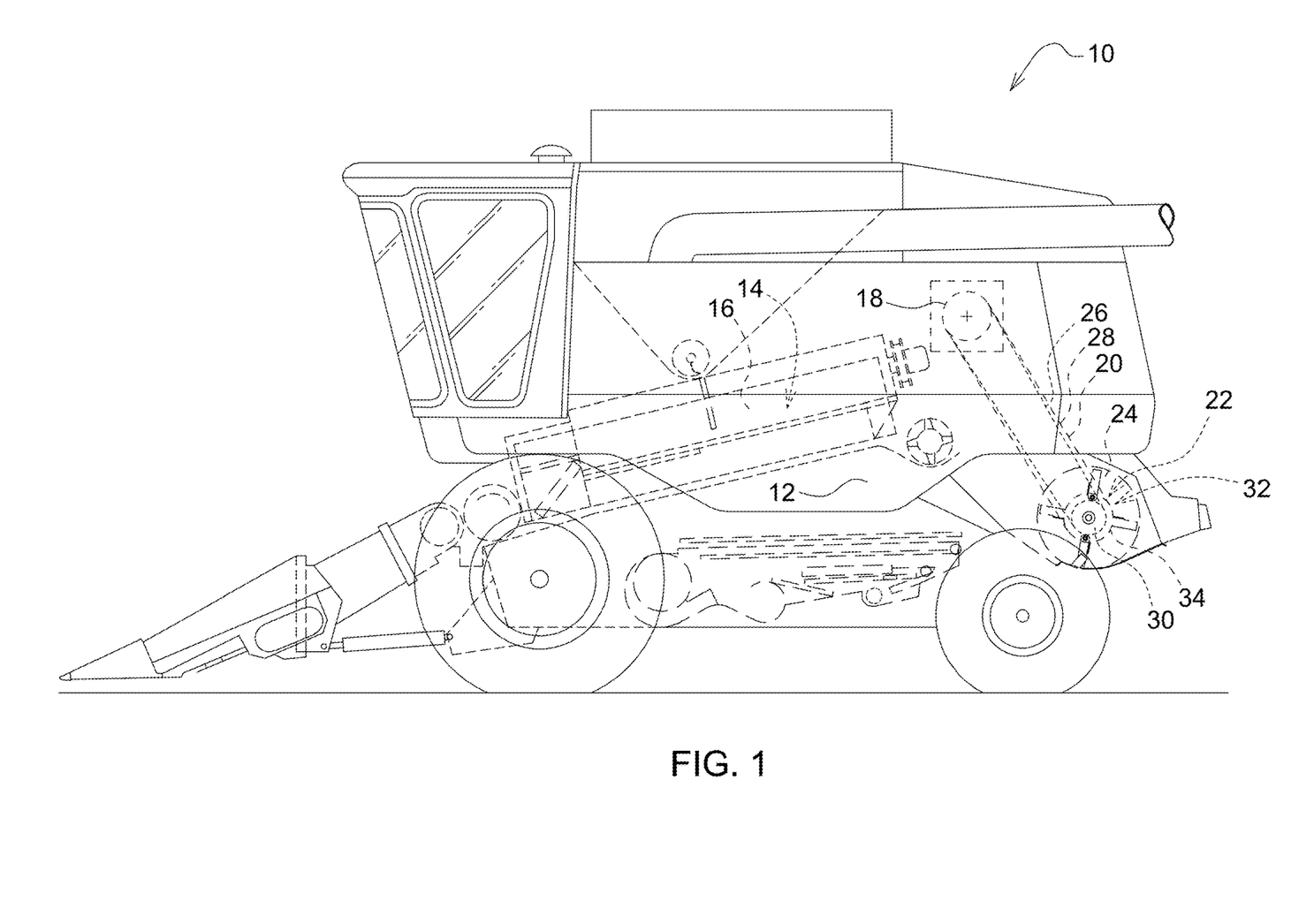
FIG. 1 shows a schematic side view of a harvesting machine having a belt drive in accordance with an embodiment of the present disclosure.

FIG. 1 shows a self-propelled agricultural machine 10, configured by way of example in the form of a combine harvester. It is also conceivable for the exemplary embodiment described in more detail below to be implemented on some other type of self-propelled agricultural machine, for example a forage harvester, a mowing machine, a sugar cane harvester or a baler to name non-limiting examples.

The agricultural machine 10 has a machine housing 12 and a first processing device 14 in the form of a threshing device 16, which has an axial rotor oriented in a longitudinal direction of the agricultural machine 10. The agriculture machine 10 is driven by an internal combustion engine 18 (illustrated merely schematically). The internal combustion engine 18 is connected at the output side to a belt drive 20 by means of which a processing device, in this case a chopping device 22 having a chopping drum 24, is driven. The belt drive 20 includes a first and a second drive belt 26, 28, wherein the first drive belt 26 is connected to a first drive input element 32, including a pulley 30, of a transmission device 34, and the second drive belt 28 is connected to a second drive input element 38, including a pulley 36, of the transmission device 34. The transmission device 34 serves for driving the chopping device 22 with two rotational speed stages.

Figure 2:
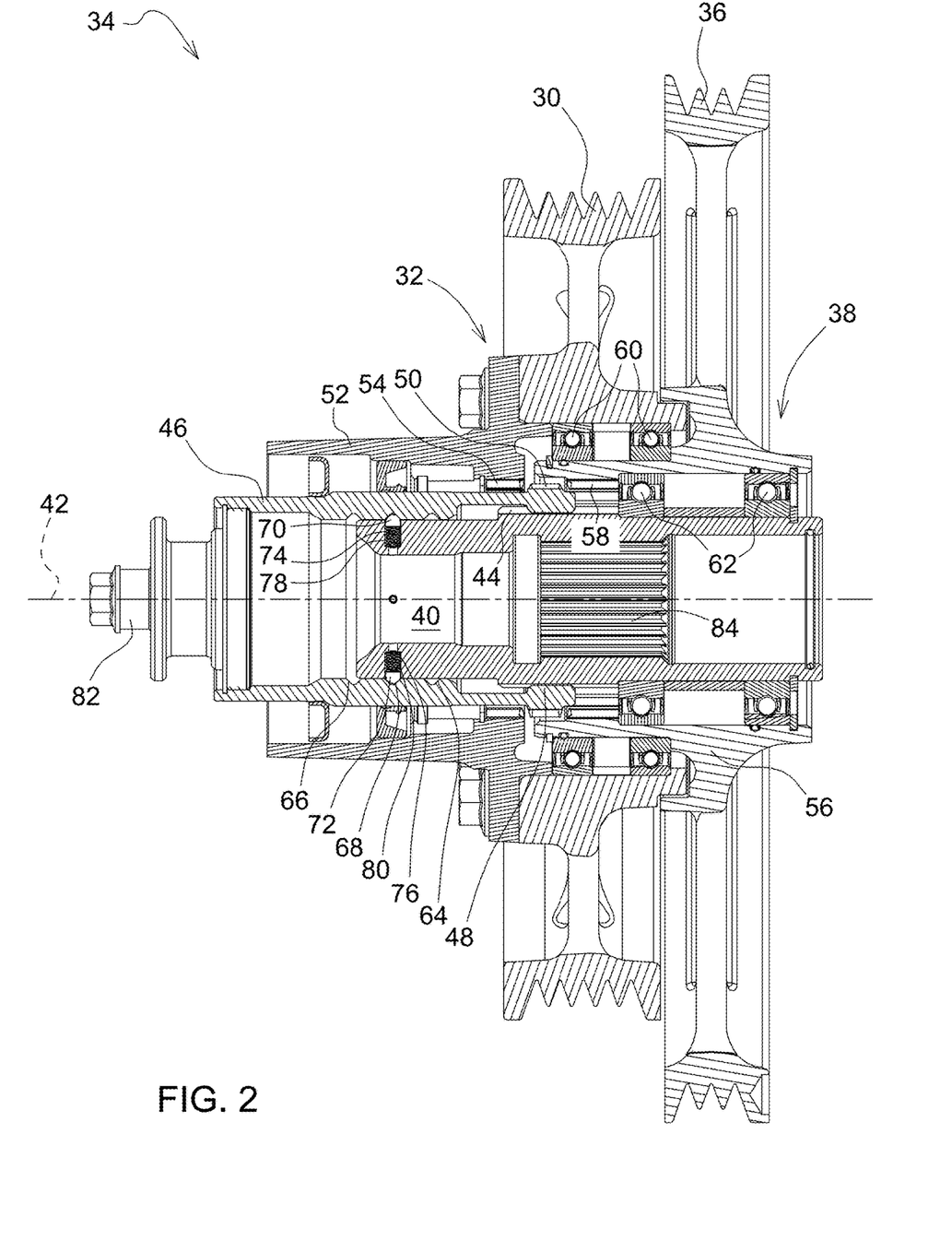
FIG. 2 shows a schematic cross-sectional view of a transmission device for a belt drive in an idle position in accordance with an embodiment of the present disclosure.
Figure 3:
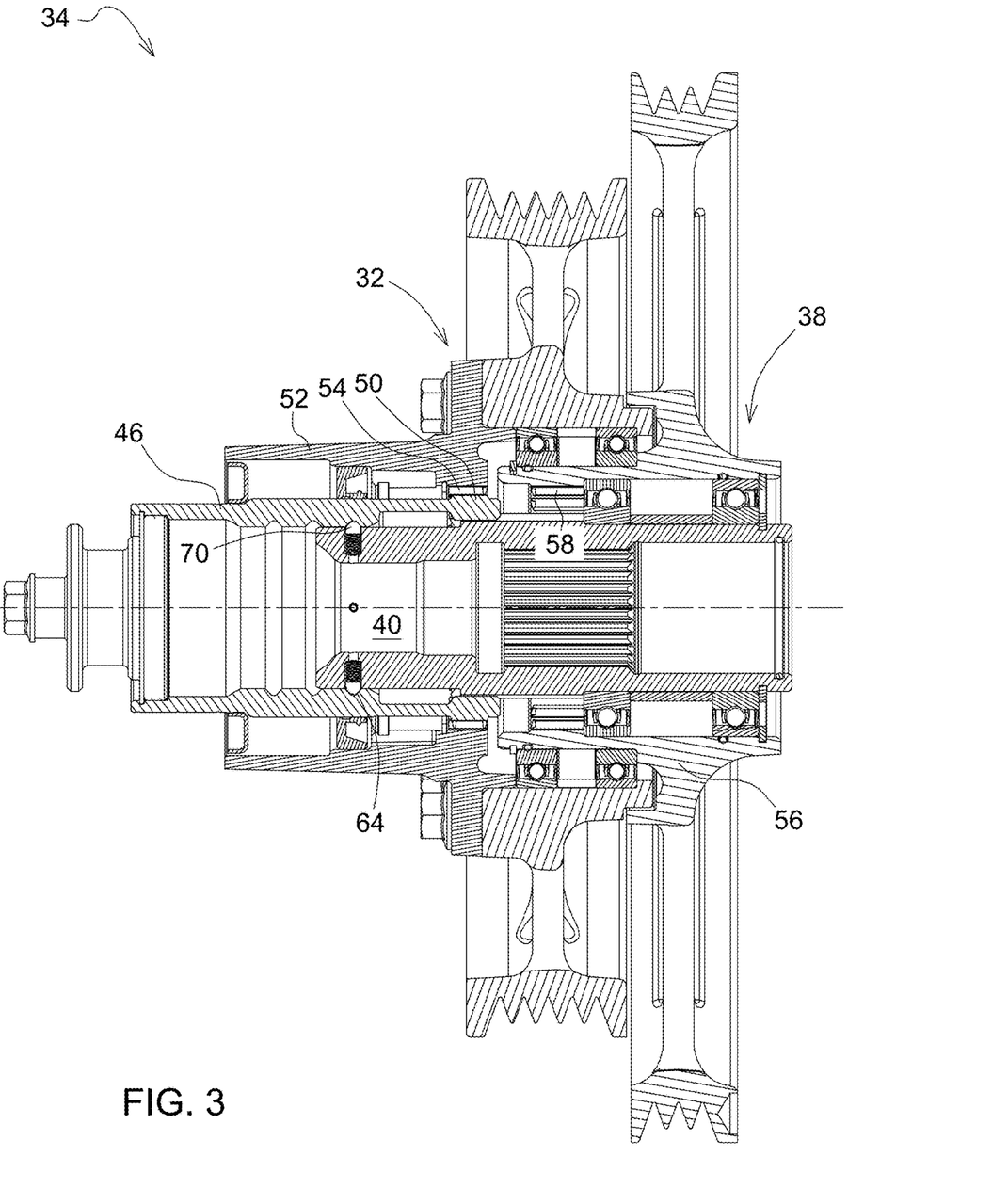
FIG. 3 shows a schematic cross-sectional view of the transmission device in a first shift position in accordance with an embodiment of the present disclosure.

FIGS. 2 and 3 illustrate further details of the transmission device 34. In this example, the transmission device 34 is formed as part of the belt drive 20 (not illustrated in any more detail) and includes the pulleys 30 and 36, which constitute a part of the first and of the second drive input element 32, 38 respectively. The first and the second pulley 30, 36 are driven, or set in rotation, by the first and the second drive belt 26, 28 respectively.

The transmission device 34 includes a drive output shaft 40, which rotates about an axis of rotation 42. The drive output shaft 40 is configured with an external toothing 44. A shift sleeve 46 configured as a hollow shaft is mounted axially displaceably, and rotationally symmetrically with respect to the axis of rotation 42, on the drive output shaft 40, wherein the shift sleeve 46 has an internal toothing 48 and an external toothing 50. The internal toothing 48 of the shift sleeve 46 is connected in terms of drive to the external toothing 44 of the drive output shaft 40.

The first drive input element 32 includes not only the pulley 30 but also a drive input hub 52, which is screwed rotationally conjointly to the pulley 30. The drive input hub 52 of the first drive input element 32 is equipped with an internal toothing 54 that can be placed in engagement with the external toothing 50 of the shift sleeve 46 as a result of axial displacement of the shift sleeve. In other words, an internal toothing 54 is formed on the first drive input element 32, which internal toothing can be placed in engagement with the external toothing 50 of the shift sleeve 46. The second drive input element 38 is equipped with a drive input hub 56 formed in the pulley 36, wherein the pulley 36 and drive input hub 56 are of monolithic or integral form. The drive input hub 56 of the second drive input element 38 is likewise equipped with an internal toothing 58 that can likewise be placed in engagement with the external toothing 50 of the shift sleeve 46 as a result of axial displacement of the shift sleeve. In other words, an internal toothing 58 is likewise formed on the second drive input element 38, which internal toothing can be placed in engagement with the external toothing 50 of the shift sleeve 46. The internal toothing 54 of the first drive input element 32, the external toothing 50 of the shift sleeve 46 and the internal toothing 58 of the second drive input element 38 are dimensioned and spaced apart relative to one another in an axial direction with respect to the axis of rotation 42 such that the external toothing 50 of the shift sleeve 46 can be completely disengaged from the internal toothing 54 of the first drive input element 32 or from the second internal toothing 58 of the second drive input element 38, and can be positioned between the two internal toothings 54, 58 without being connected in terms of drive to either of the two internal toothings 54, 58. In other words, the shift sleeve 46 can be moved into three shift positions: into a first shift position (with a connection in terms of drive), in which the external toothing 50 of the shift sleeve 46 is engaged into the internal toothing 54 of the first drive input element 32; into a second shift position (with a connection in terms of drive), in which the external toothing 50 of the shift sleeve 46 is engaged into the internal toothing 58 of the second drive input element 38; and into a third shift position, in which the external toothing 50 of the shift sleeve 46 is positioned axially between the two internal toothings 54, 58 of the first and of the second drive input element 32, 38. The third shift position constitutes an idle position without a connection in terms of drive, in which the external toothing 50 of the shift sleeve 46 has been disengaged from one of the two internal toothings 54, 58 and a connection in terms of drive to one of the two internal toothings 54, 58 has been correspondingly eliminated.

The pulley 30 of the first drive input element 32 is mounted rotatably and axially fixedly on the drive input hub 56 of the pulley 36 of the second drive input element 38 via a set of ball bearings 60. The drive input hub 56 of the pulley 36 of the second drive input element 38 is furthermore mounted rotatably and axially fixedly on the drive output shaft 40 via a further set of ball bearings 62. The internal toothings 54, 58 of the first and of the second drive input element 32, 38 and the external toothing 50 of the shift sleeve 46 are of complementary configuration with respect to one another, such that a rotationally conjoint connection and axial displaceability are ensured. The same applies to the internal toothing 48 of the shift sleeve 46 and the external toothing 44 of the drive output shaft 40. Altogether, the transmission device 34 thus includes three toothing pairings: a first toothing pairing consisting of the external toothing 50 of the shift sleeve 46 and the internal toothing 54 of the first drive input element 32; a second toothing pairing consisting of the external toothing 50 of the shift sleeve 46 and the internal toothing 58 of the second drive input element 38, and a third toothing pairing consisting of the internal toothing 48 of the shift sleeve 46 and the external toothing 44 of the drive output shaft 40.

Figure 4:
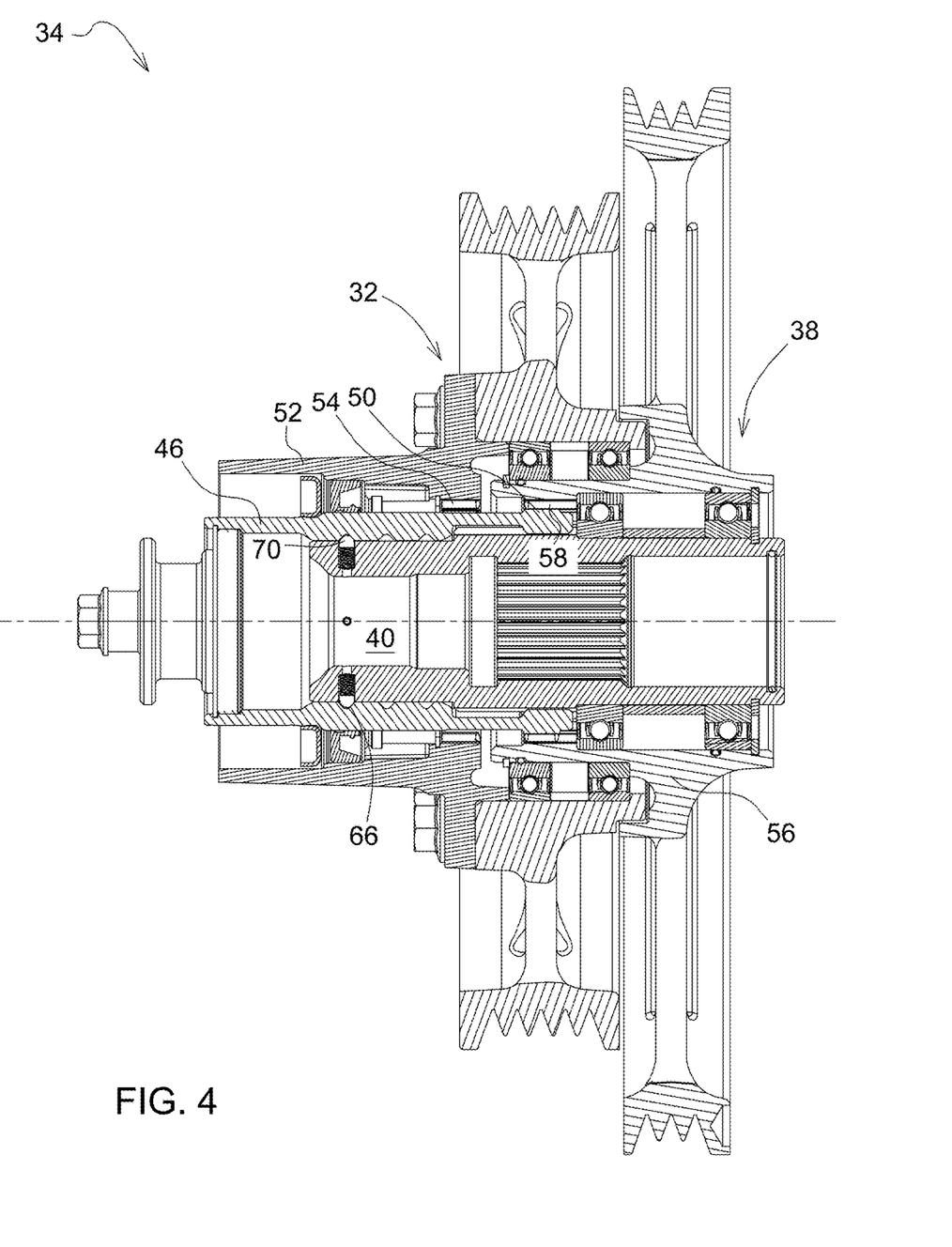
FIG. 4 shows a schematic cross-sectional view of a transmission device in a second shift position in accordance with an embodiment of the present disclosure.

As disclosed herein, the shift sleeve 46 can be positioned in three shift positions by being axially displaced on the drive output shaft 40. In order to ensure axial fixing and correct axial positioning of the shift sleeve 46 on the drive output shaft 40, a first (axially inner), a second (axially outer) and a third (axially central) annular groove 64, 66, 68 are formed on the radially inner side of the shift sleeve 46, which annular grooves can in each case be placed in engagement with a first and a second detent bolt 70, 72. The detent bolts 70, 72 are guided, at circumferentially opposite positions, in radial bores 74, 76 that are formed in the outside of the drive output shaft 40. The detent bolts 70, 72 are in each case preloaded by means of a spring 78, 80. By virtue of the shift sleeve 46 being displaced axially relative to the drive output shaft 40, the annular grooves 64, 66, 68 can be placed in engagement with the detent bolts and the shift sleeve 46 can be fixed. For the first shift position, in which the external toothing 50 of the shift sleeve 46 is engaged into the internal toothing 54 of the first drive input element 32, the shift sleeve 46 is fixed by virtue of the first annular groove 64 being engaged with the detent bolts 70, 72 (see FIG. 3). For the second shift position, in which the external toothing 50 of the shift sleeve 46 is engaged into the internal toothing 58 of the second drive input element 38, the shift sleeve 46 is fixed by virtue of the second annular groove 66 being engaged with the detent bolts 70, 72 (see FIG. 4). For the third shift position (idle position), in which the external toothing 50 of the shift sleeve 46 is positioned axially between the two internal toothings 54, 58 of the first and of the second drive input element 32, 38, the shift sleeve 46 is fixed by virtue of the third annular groove 68 being engaged with the detent bolts 70, 72 (see FIG. 2).

For actuation and handling for the purposes of axially displacing and rotationally aligning the shift sleeve 46 (rotation of the shift sleeve 46), an actuating boss 82 is provided which is axially fixed to the outer end (axially at the outside) of the shift sleeve 46 and which is connected rotationally conjointly to the shift sleeve 46. Here, the outer end of the shift sleeve 46 (axially at the outside) describes the free end, which is not guided on the drive output shaft 40, of the shift sleeve 46. An inner end of the shift sleeve 46 (axially at the inside) correspondingly describes that end of the shift sleeve 46 which is guided on the drive output shaft 40.

The drive output shaft 40 is configured as a hollow shaft with a further internal toothing 84 and may in turn be in engagement with an external toothing of a drive input shaft (not shown) in order to drive the processing device 14 or some other item of equipment or device (not shown) for processing harvested material. For example, chopping devices, cutting devices, blower devices or conveying devices, which must be driven at different rotational speeds, are conceivable here. The different rotational speeds are achieved by virtue of the pulleys 30, 36 being formed with different diameters, whereby different transmission ratios are achieved.

Figure 5:
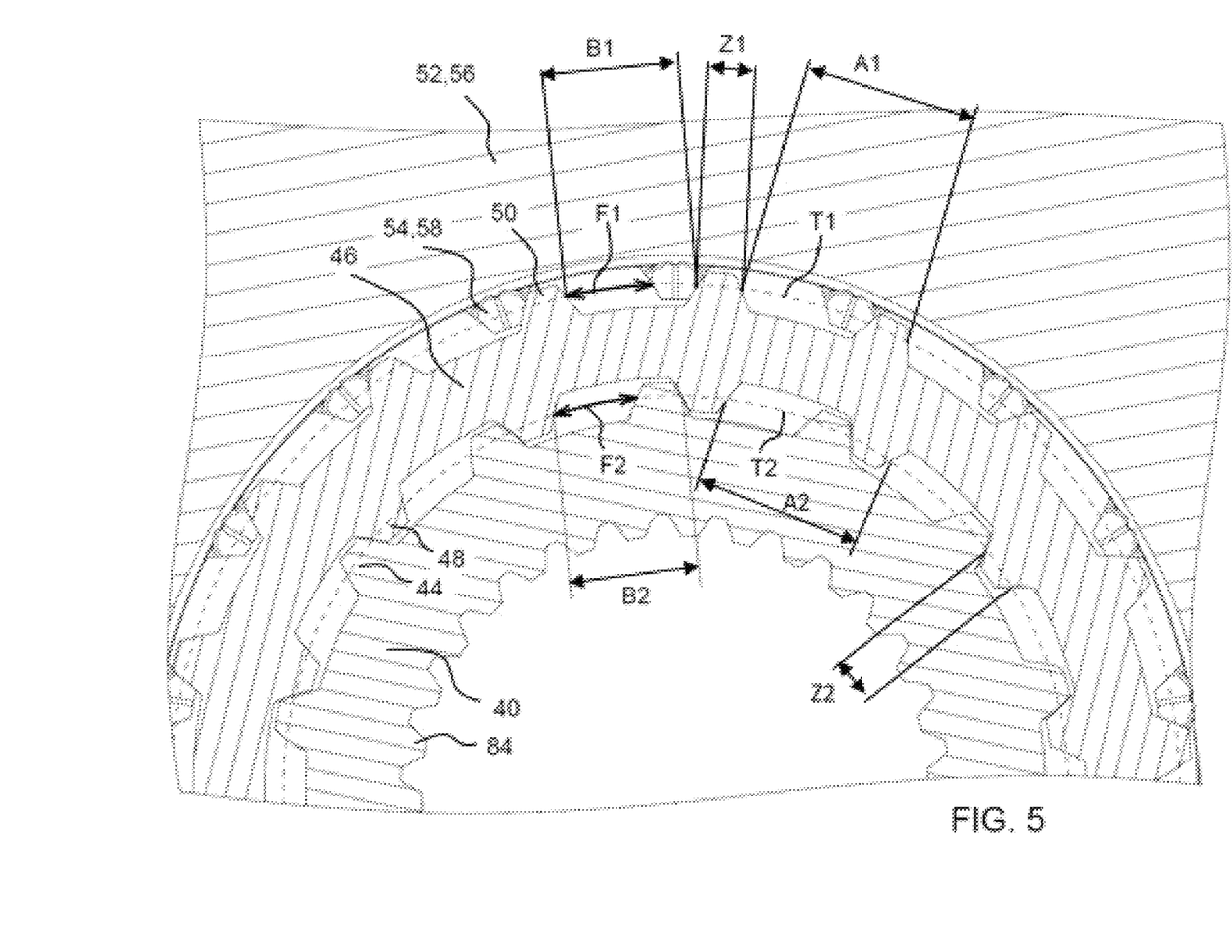
FIG. 5 shows a schematic cross-sectional view of toothing pairings in the transmission device in accordance with an embodiment of the present disclosure.

As has already been described in the introduction, during a change from one shift position to another shift position by axial displacement of the shift sleeve 46, the external toothing 50 of the shift sleeve 46 may be engaged into the respective internal toothings 54, 58 of the first and of the second drive input element 32, 38. This is enabled by the end faces of the teeth of the respective toothings not abutting against one another. To ensure this, the shift sleeve 46 may be rotated or aligned before the engagement process, such that the teeth of the external toothing 50 are guided into the tooth spaces of the relevant internal toothing. To make the rotation and alignment as straightforward as possible, the intermediate spaces between the teeth, or the tooth spaces, of the internal toothings 54 and 58 of the drive input elements 32, 34, of the external toothing 50 of the shift sleeve 46, of the internal toothing 48 of the shift sleeve 46 and of the external toothing 44 of the drive output shaft 40 have been selected so as to yield a limited free travel (F1, F2) of the shift sleeve 46 (in a direction of rotation) relative to the drive input elements 32, 34, or drive input hubs 52, 56, and the drive output shaft 40 (as is schematically illustrated in FIG. 5). The shift sleeve 46 can thus be aligned by being adjusted through at least twice one toothing width (Z1, Z2) (based on the relevant pitch circle (T1, T2) of the toothings) virtually without resistance, that is to say without significant torques opposing the direction of rotation, such that, for every rotational position of the shift sleeve 46, a free travel (F1, F2) is ensured which is sufficient to allow any abutment of the end faces of the teeth against one another during the engagement process to be eliminated. In other words, every possible state of overlap during a shift operation from one shift position into another shift position (that is to say every possible misalignment during the engagement process) may be eliminated by way of the free travel (F1, F2). A limited free travel (F1, F2) for the shift sleeve 46 is thus created, which is provided in both circumferential directions depending on the rotational position of the shift sleeve 46. That is to say, in every rotational position or shift position, the shift sleeve 46 is freely rotatable to a certain rotational extent without any engagement of the teeth, neither of the drive input elements 32, 34 nor of the drive output shaft 40. The limited free travel (F1, F2) covers approximately an arc length of the relevant pitch circle (T1, T2) of twice one tooth width (Z1, Z2) at the relevant pitch circle (T1, T2).

According to FIG. 5, the tooth spacing (A1, A2) for the respective toothing pairings is dimensioned such that the first, second and third toothing pairings are configured with a tooth pitch (p) which is greater by approximately a factor of 2 than a tooth pitch ($p_m$) associated with standardized tooth gear moduli (m), such that a tooth spacing (A1, A2) that is greater by approximately a factor of 2 is achieved for the internal toothings 54, 58 of the drive input hubs 52, 56, for the external toothing 50 and the internal toothing 48 of the shift sleeve 66, and for the external toothing 44 of the drive output shaft 40. Here, the tooth spacing (A1, A2) is understood to mean the distance between two identical points on two adjacent teeth on the relevant pitch circle (T1, T2). The tooth spacing (A1, A2) thus directly influences a tooth space width (B1, B2) or tooth intermediate space length at the level of the relevant pitch circle (T1, T2) of the toothing pairing. With such a configuration of the toothings, the tooth spacing (A1, A2) in the respective toothing pairings is doubled in relation to a standardized toothing, wherein the tooth geometry, that is to say the shape and size of the teeth, is maintained so as to correspond to the tooth geometry associated with the standardized tooth moduli (m). The ratio of the tooth space width (B1, B2) or tooth intermediate space length to tooth width (Z1, Z2) at the level of the relevant pitch circle (T1, T2) is thus approximately tripled (from approximately 1 (with a single tooth space) to approximately 3 (with a tripled tooth space)). In other words, the toothing pairings according to the disclosure between shift sleeve 46 and drive output elements 32, 34, and between shift sleeve 46 and drive output shaft 40, are formed with only every second tooth in relation to a standardized toothing pairing. Alternatively, conversely, the toothing pairings illustrated in FIG. 5 are obtained or formed by virtue of only every second tooth from the standardized toothing pairing with standardized tooth moduli (m) being formed. An available play (tooth space widths (B1, B2) or tooth intermediate space lengths) for the engagement of the teeth is thus approximately tripled. The tooth pitch (p) that is greater by a factor of 2 (in relation to a tooth pitch ($p_m$) associated with standardized tooth moduli (m)) is applied both to the two toothing pairs on the outside of the shift sleeve 46 (internal toothing 54, 58 of the drive input hubs 52, 56 with the external toothing 50 of the shift sleeve 46) and to the third toothing pairing on the inside of the shift sleeve 46 (internal toothing 48 of the shift sleeve 46 with the external toothing 44 of the drive output shaft 40), such that it is also the case there that the tooth spacing (A1, A2) (based on the relevant pitch circle (T1, T2) or at the level of the pitch circle (T1, T2)) is increased from approximately one tooth width (Z1, Z2), according to the standard, to approximately three times one tooth width (Z1, Z2), as per FIG. 5.

The various embodiments of the present disclosure include a transmission device having a first drive input element, a second drive input element, a shift sleeve configured as a hollow shaft, and a drive output shaft. The shift sleeve is mounted axially displaceably on the drive output shaft and can be moved by axial displacement into a first, a second or a third shift position.

An internal toothing is formed on each of the first and the second drive input element, an external toothing and an internal toothing are formed on the shift sleeve, and an external toothing is formed on the drive output shaft. In the first shift position, the external toothing of the shift sleeve forms a first toothing pairing with the internal toothing of the first drive input element. In the second shift position, the external toothing of the shift sleeve forms a second toothing pairing with the internal toothing of the second drive input element. Furthermore, the internal toothing of the shift sleeve forms a third toothing pairing with the external toothing of the drive output shaft.

In conventional transmission devices, only one pulley may be provided at the drive input side, wherein, in the case of a non-variable pulley as in one or more embodiments described herein, a transmission device in the form of a planetary gear set is provided, which is operated by way of the shift toothed gear in order to realize different drive output rotational speeds. The transmission and shift device are thus of complex design and take up additional structural space. They are also expensive.

Without in any way limiting the scope, interpretation, or application of the claims appearing below, one or more of the example embodiments disclosed herein provides multiple technical effects. In order to avoid expensive and complex transmission devices, belt drives may be provided in combination with transmission devices which have two pulleys at the drive input side, with different rotational speeds or different transmission ratios being achieved by activating and deactivating the respective pulleys. Such transmission devices having two pulleys may be used for example in belt drives of combine harvesters with chopping devices or other devices for processing harvested material (for example threshing or cutting). The aforementioned belt drives having two pulleys may also be used for driving blower devices in harvesting machines. The aforementioned chopping devices include chopping drums that are driven by means of such a belt drive. The different rotational speeds are used for example for adapting the chopping device to the harvested material and to the operator's requirements for varying, for example, the chop length of the harvested material. It is also desired by the operator for threshing work to be performed without subsequent chopping. The belt drives provided for driving the chopping devices are commonly branched off by means of a pulley that is connected to the drive engine of the harvesting machine. The chopping device is thus generally connected directly to the rotational speed of the drive engine, which has the effect that the components of the chopping device, such as seals, bearings and lubrication means, are directly influenced by the rotational speed of the drive engine. The aforementioned components in chopping devices are generally designed for a maximum rotational speed range, which could be exceeded in the case of high rotational speeds of the drive engine. In the case of excessively high rotational speeds, the components may be subjected to the associated high temperatures, with the possible result of damage and premature wear, in particular to the seals. To avoid this, in the case of excessively high rotational speeds of the drive engine, it is desirable to adapt the drive transmission ratio of the chopping device, or to reduce a resulting excessively high rotational speed of the chopping device, such that excessively high rotational speeds can be avoided for the components. It is also advisable to create an apparatus by means of which a chopping device can be selectively decoupled from the drive provided by the drive engine. Belt drives are similarly also used for other processing devices of harvesting machines. For example, as the material for harvesting is harvested, provision may be made for the flow of harvested material to be threshed, chopped, cut or processed in some other way, wherein different drive stages, and thus a rotational speed variation, are provided for the processing devices, such as a chopping drum. Ultimately, the aforementioned transmission devices are used in a variety of types of harvesting machines with belt drives for a wide variety of processing devices, for example not only in combine harvesters but also in forage harvesters, sugar cane harvesters and balers.

The design and manufacture of toothings is based on toothed gear standards such as DIN 780. DIN 780 defines a standardized toothed gear modulus m as a measure for the size of the teeth of toothed gears, wherein the standardized toothed gear modulus m is calculated from the pitch circle diameter d of the toothed gear divided by the number of teeth z of the toothed gear, m=d/z. In order to simplify the selection of toothed gears that fit together, and in order to be able to use standardized tools, DIN 780 defines preferred ranges that specify a tooth pitch $p_m$ associated with a particular standardized tooth modulus m, wherein the tooth pitch $p_m$ is defined as a ratio of the toothed gear circumference U at the pitch circle (with pitch circle diameter d) to the number of teeth z, that is to say $p_m$=U/z. With pi π=U/d, or from U=π*d, it follows that the tooth pitch $p_m$ is defined by $p_m$=π*d/z or $p_m$=π*m. The tooth pitch $p_m$ is thus also defined as the arc length on the pitch circle (with pitch circle diameter d) between two identical points, lying on the pitch circle, of two adjacent teeth of a toothed gear with a standardized tooth modulus m. The object of the present disclosure is a transmission device of the types and embodiments described herein wherein shift operations can be performed in a simplified manner.

According to the present disclosure, a transmission device of various embodiments described herein is configured such that the first, second and third toothing pairing are configured with a tooth pitch p which is greater by approximately a factor of 2 than a tooth pitch $p_m$ associated with standardized toothed gear moduli, such that a tooth spacing that is greater by approximately a factor of 2 can be achieved. Here, the tooth spacing is understood to mean the distance between two identical points on two adjacent teeth on the pitch circle. The tooth spacing thus directly influences a tooth space width or tooth intermediate space length at the level of the pitch circle, in each case in a circumferential direction. With such a configuration of the toothings, the tooth spacing in the respective toothings is doubled in relation to a standardized toothing, wherein the tooth geometry, that is to say the shape and size of the teeth, is maintained so as to correspond to the tooth geometry associated with the standardized tooth moduli. The ratio of the tooth space width or tooth intermediate space length to tooth width is thus approximately tripled at the level of the pitch circle diameter (from approximately 1 (single tooth space) to approximately 3 (tripled tooth space)). For a toothing pairing with an even number of teeth in each toothing (toothed gears with even numbers of teeth), a toothing pairing according to the disclosure arises for example by virtue of the latter being formed with only every second tooth in relation to a standardized toothing pairing (with an even number of teeth in each toothing). Alternatively, conversely, a toothing pairing according to the disclosure is obtained by virtue of only every second tooth from the standardized toothing pairing (with an even number of teeth in each toothing) with standardized tooth moduli being formed. In other words again, a toothing pairing according to the disclosure is obtained by virtue of every second tooth being removed from the standardized toothing pairing with standardized tooth moduli (with an even number of teeth in each toothing). For example, a toothing pairing according to the disclosure is obtained by virtue of a toothing pairing consisting of an internal toothing and an external toothing conforming to standardized tooth moduli, with tooth modulus m, diameter d and a number of 28 teeth, being modified to have a number of 14 teeth whilst having the same tooth modulus m and diameter d. A tooth space (tooth space widths or tooth intermediate space lengths) available for the engagement of the teeth is thus approximately tripled, from approximately one tooth width (corresponding to the standard) to approximately three tooth widths. The tooth pitch p that is greater by a factor of 2 (in relation to a tooth pitch $p_m$ associated with a standardized tooth modulus) is also applied, on the inside of the shift sleeve, to the third toothing pairing, such that it is also the case there that the tooth spacing is increased from approximately one tooth width to approximately three tooth widths (based in each case on the pitch circle of the toothing). A limited free travel is thus created for the shift sleeve in both circumferential directions, because the shift sleeve is now, in every shift position, rotatable to a certain rotational extent without any engagement of the teeth, neither of the drive input elements nor of the drive output shaft. The limited free travel covers approximately an arc length of the pitch circle of two tooth widths at the pitch circle. In other words, the extent of the limited free travel over two tooth widths ensures that any possible state of overlap during a shift operation from one shift position into another shift position (that is to say any possible misalignment during the engagement operation) can be eliminated. The shift sleeve, with its external toothing, can thus be rotated and aligned in order to be engaged into the tooth spaces of the drive input elements without being subjected to any opposing forces or opposing moments from the drive output shaft or from a drive output train connected to the drive output shaft. The shift sleeve can be rotated or aligned in virtually torque-free fashion, whereby shift operations can be performed virtually without any application of force.

In a further embodiment of the disclosure, annular grooves are formed on the inside of the shift sleeve, and one annular groove is assigned to each shift position, which annular grooves can in each case be placed in engagement, by axial displacement of the shift sleeve on the drive output shaft, with a detent bolt that is mounted in spring-preloaded fashion in the drive output shaft. The detent bolt, which can be introduced into the annular grooves by axial displacement of the shift sleeve, fixes the shift sleeve in its various shift positions. An annular groove is thus provided, on the radially inner side of the shift sleeve, for each shift position (for the shift positions in which the shift sleeve is fully engaged into the first or second drive input element, and for the idle shift position, that is to say the shift position in which the shift sleeve is not engaged into any of the drive input elements). In each of the shift positions, the detent bolt that is mounted in the drive output shaft can thus engage or project into the corresponding annular groove, and correspondingly fix the shift sleeve, under the action of spring preload. The spring preload of the detent bolt is dimensioned such that the detent bolt can be relatively easily disengaged from the particular annular groove by manual axial displacement of the shift sleeve.

At a free axial end of the shift sleeve, there may be formed an actuating boss for the axial adjustment and rotational alignment of the shift sleeve (rotation of the shift sleeve). The actuating boss allows convenient and practical handling of the shift sleeve during a change of the shift position, in particular when the shift sleeve is axially displaced and/or rotated relative to the drive output shaft.

In a further embodiment of the disclosure, the drive output shaft is configured as a hollow shaft and is equipped with an internal toothing. This allows straightforward connection in terms of drive to an externally toothed connection shaft that is to be driven by the transmission device, for example a connection shaft for a chopping device, threshing device, cutting device or blower device on a harvesting machine.

The transmission device is particularly suitable for a belt drive, wherein, at the drive input side, the first and the second drive input element each comprise a pulley and are connected to a belt drive. The pulleys may have different outer diameters in order to achieve a rotational speed variation in the case of equal belt speeds or belt rotational speeds. It is however also possible to provide a rotational speed variation with different belt speeds at the respective pulleys.

The transmission device is suitable as a drive component in a belt drive of a harvesting machine, for example a combine harvester, forage harvester, mowing machine, baler, sugar cane harvester or a cotton picker. Each of these harvesting machines has drive or auxiliary assemblies which are driven by means of belt drives and which, depending on the application and harvesting conditions, are often best operated with different drive input rotational speed conditions. For example, in the case of very densely planted crops, it may be necessary to operate the harvesting machine with a high drive rotational speed but to reduce the rotational speed dependency of the auxiliary drive or auxiliary assembly, owing to a high drive input rotational speed, so as not to overheat or overload the auxiliary assembly.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:
1. A transmission device comprising:
 a first drive input element;
 a second drive input element;

a shift sleeve configured as a hollow shaft; and
a drive output shaft;
wherein the shift sleeve is mounted axially displaceably on the drive output shaft and is configured to be moved by axial displacement into one of a first position, a second position, and a third shift position;
wherein an internal toothing is formed on each of the first drive input element and the second drive input element;
wherein an external toothing and an internal toothing are formed on the shift sleeve;
wherein an external toothing is formed on the drive output shaft;
wherein, in the first shift position, the external toothing of the shift sleeve forms a first toothing pairing with the internal toothing of the first drive input element;
wherein, in the second shift position, the external toothing of the shift sleeve forms a second toothing pairing with the internal toothing of the second drive input element;
wherein the internal toothing of the shift sleeve forms a third toothing pairing with the external toothing of the drive output shaft; and
wherein the first toothing pairing, the second toothing pairing, and the third toothing pairing are configured with a tooth pitch which is greater by a factor of two than a tooth pitch associated with standardized toothed gear moduli such that a tooth spacing that is greater by a factor of two is achieved.

2. The transmission device of claim 1, wherein a plurality of annular grooves is formed on the inside of the shift sleeve, and one of the plurality of annular grooves is assigned to each of the first shift position, the second shift position, and the third shift position, wherein each of the plurality of annular grooves is placed in engagement, by axial displacement of the shift sleeve on the drive output shaft, with at least one detent bolt that is mounted in spring-preloaded fashion in the drive output shaft.

3. The transmission device of claim 1, wherein, on one axial end of the shift sleeve, there is formed an actuating boss for the axial adjustment and rotational alignment of the shift sleeve.

4. The transmission device of claim 1, wherein the drive output shaft is configured as a hollow shaft and has an internal toothing.

5. The transmission device of claim 1, wherein the transmission device is configured as a belt drive transmission, and the first drive input element and the second drive input element each comprise a pulley.

6. An agricultural harvesting machine having a belt drive and a transmission device assigned to the belt drive, the transmission device comprising:
a first drive input element;
a second drive input element;
a shift sleeve configured as a hollow shaft; and
a drive output shaft;
wherein the shift sleeve is mounted axially displaceably on the drive output shaft and is configured to be moved by axial displacement into one of a first position, a second position, and a third shift position;
wherein an internal toothing is formed on each of the first drive input element and the second drive input element;
wherein an external toothing and an internal toothing are formed on the shift sleeve;
wherein an external toothing is formed on the drive output shaft;
wherein, in the first shift position, the external toothing of the shift sleeve forms a first toothing pairing with the internal toothing of the first drive input element;
wherein, in the second shift position, the external toothing of the shift sleeve forms a second toothing pairing with the internal toothing of the second drive input element;
wherein the internal toothing of the shift sleeve forms a third toothing pairing with the external toothing of the drive output shaft; and
wherein the first toothing pairing, the second toothing pairing, and the third toothing pairing are configured with a tooth pitch which is greater by a factor of two than a tooth pitch associated with standardized toothed gear moduli such that a tooth spacing that is greater by a factor of two is achieved.

7. The agricultural harvesting machine of claim 6, wherein a plurality of annular grooves is formed on the inside of the shift sleeve, and one of the plurality of annular grooves is assigned to each of the first shift position, the second shift position, and the third shift position, wherein each of the plurality of annular grooves is placed in engagement, by axial displacement of the shift sleeve on the drive output shaft, with at least one detent bolt that is mounted in spring-preloaded fashion in the drive output shaft.

8. The agricultural harvesting machine of claim 6, wherein, on one axial end of the shift sleeve, there is formed an actuating boss for the axial adjustment and rotational alignment of the shift sleeve.

9. The agricultural harvesting machine of claim 6, wherein the drive output shaft is configured as a hollow shaft and has an internal toothing.

10. The agricultural harvesting machine of claim 6, wherein the transmission device is configured as a belt drive transmission, and the first drive input element and the second drive input element each comprise a pulley.

* * * * *